United States Patent [19]
Edwards

[11] 4,048,730
[45] Sept. 20, 1977

[54] LIGHT BEAM DEFLECTION MEANS PARTICULARLY FOR RANGE COMPENSATION IN WEAPONS TRAINING AIDS

[75] Inventor: Michael John Edwards, Godalming, England

[73] Assignee: RFD Systems Engineering Limited, Great Britain

[21] Appl. No.: 639,919

[22] Filed: Dec. 11, 1975

[30] Foreign Application Priority Data

June 24, 1975 United Kingdom .............. 26784/75

[51] Int. Cl.² .............................................. F41G 3/26
[52] U.S. Cl. .................................... 35/25; 273/105.1; 350/285
[58] Field of Search ............... 350/6, 285, 289; 356/3, 356/6, 8, 9, 11, 17, 18, 22; 74/567, 569; 352/39; 35/25; 273/101, 101.1, 105.1; 353/50, 51, 98, 99

[56] References Cited
U.S. PATENT DOCUMENTS

| | | | |
|---|---|---|---|
| 2,411,741 | 11/1946 | Michaelson | 350/285 UX |
| 3,558,228 | 1/1971 | Hodges | 356/17 |

FOREIGN PATENT DOCUMENTS

519,948  4/1940  United Kingdom .............. 273/105.1

Primary Examiner—F. L. Evans
Attorney, Agent, or Firm—Kenyon & Kenyon, Reilly, Carr & Chapin

[57] ABSTRACT

Light beam deflection means particularly for range compensation apparatus in weapons training aids for altering the angle of inclination of a beam of light to a selected value, comprising a pivotally mounted mirror positioned to reflect the beam of light, a cam movable to a position dependent upon the selected inclination, a cam follower engageable with the cam, an L-shaped arm interconnecting the cam follower and the mirror, and a stop movable between an operative extended position in which the stop acts to retain the mirror in a datum position, irrespective of the position of the cam, corresponding to a datum inclination of the beam, and a retracted position in which the cam follower engages the cam in such manner that the mirror occupies a pivotal position which reflects the beam of light at the selected inclination.

7 Claims, 3 Drawing Figures

LIGHT BEAM DEFLECTION MEANS PARTICULARLY FOR RANGE COMPENSATION IN WEAPONS TRAINING AIDS

This invention relates to light beam deflection means, particularly for altering the angle of inclination of a projected beam of light in a gunnery training aid.

According to the invention light beam deflection means for altering the angle of inclination of a beam of light to a selected value comprise a pivotally mounted mirror positioned to reflect the beam of light, a cam movable to a position dependent upon the selected inclination, a cam follower engageable with the cam, linkage means interconnecting the cam follower and the mirror, and a stop movable between an operative extended position in which the stop acts to retain the mirror in a datum position, irrespective of the position of the cam, corresponding to a datum inclination of the beam and a retracted position in which the cam follower engages the cam in such manner that the mirror occupies a pivotal position which reflects the beam of light at a selected inclination.

The means interconnecting the cam follower and the mirror preferably comprise an L-shaped arm a lower end of which carries the cam follower and the upper end of which is attached to the mirror and capable of pivotal movement, under gravity and with the mirror, about a pivotal axis lying in the plane of the reflective surface of the mirror.

Light beam deflection means in accordance with the invention find particular application in target training equipment and the following description, given by way of example and with reference to the accompanying drawings, relates to such an application. In the drawings.

Figure 1:
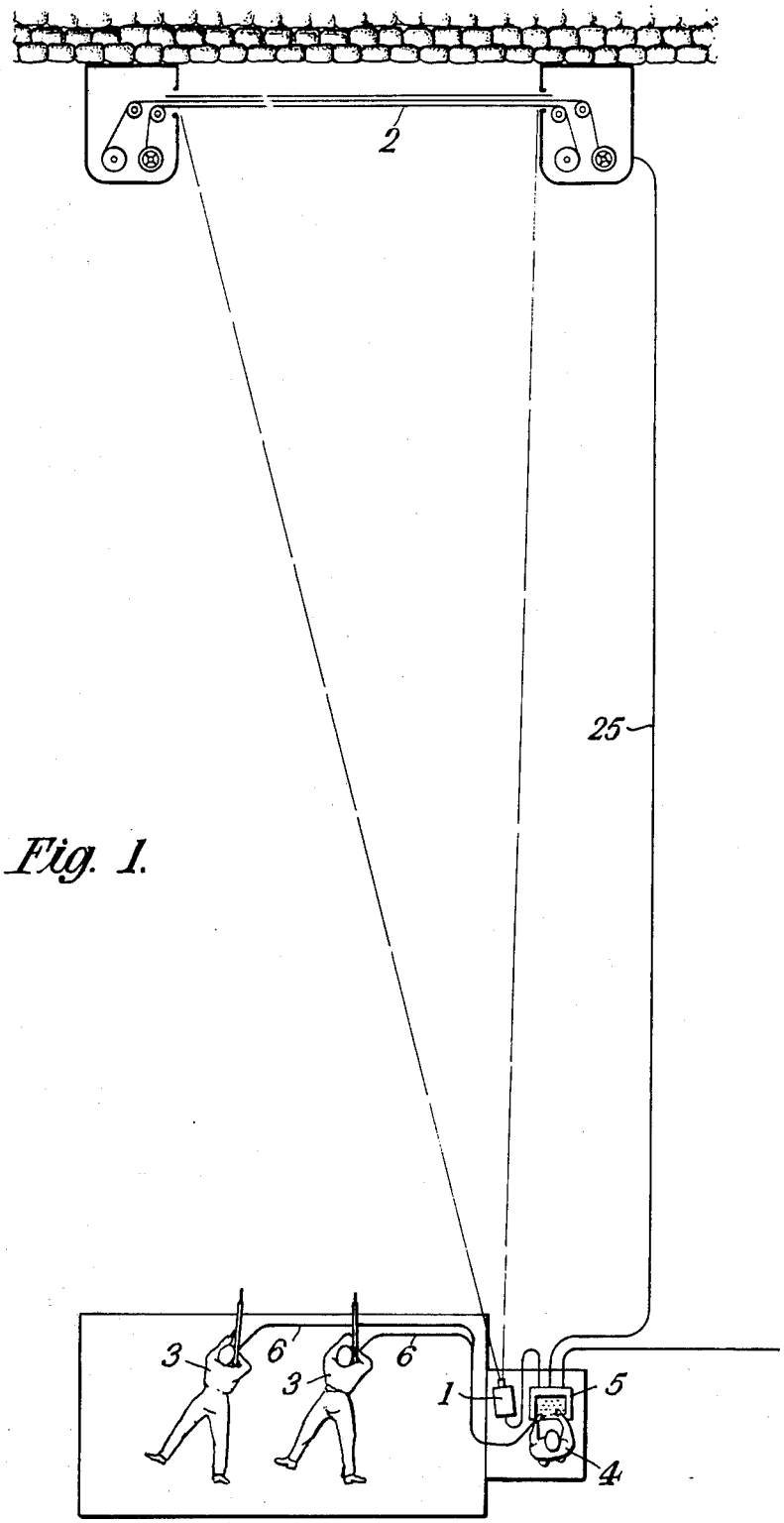
FIG. 1 is a diagrammatic plan view of the target training equipment.

Referring to FIG. 1, the training equipment comprises a projector 1 which projects on to a screen 2 a moving image which serves as a target for trainee gunners or infantrymen 3 who fire their weapons in succession at the moving target, under the control and supervision of a range officer 4.

The projector is controlled by electrical control means having a console 5. Movement of the film ceases when each weapon is fired, such synchronisation being achieved by an electrical cable 6 linking the weapon and the console 5 or by audible sensing means, such as a microphone. The apparent range of the target may be several hundred meters, and in order to compensate for trajectory drop in the path of movement followed by the bullet fired from the weapon, the stationary image emanating from the projector 1 must be raised by the appropriate small amount. It will be appreciated that the position of a hole in the screen 2 (formed by the passage of the bullet) in relation to the target provides an indication of markmanship, due account being taken of any "loop" or drop in the trajectory of the bullet. The invention is concerned with the manner of altering the inclination of the beam emanating from the projector 1 to afford the compensation mentioned.

Figure 2:
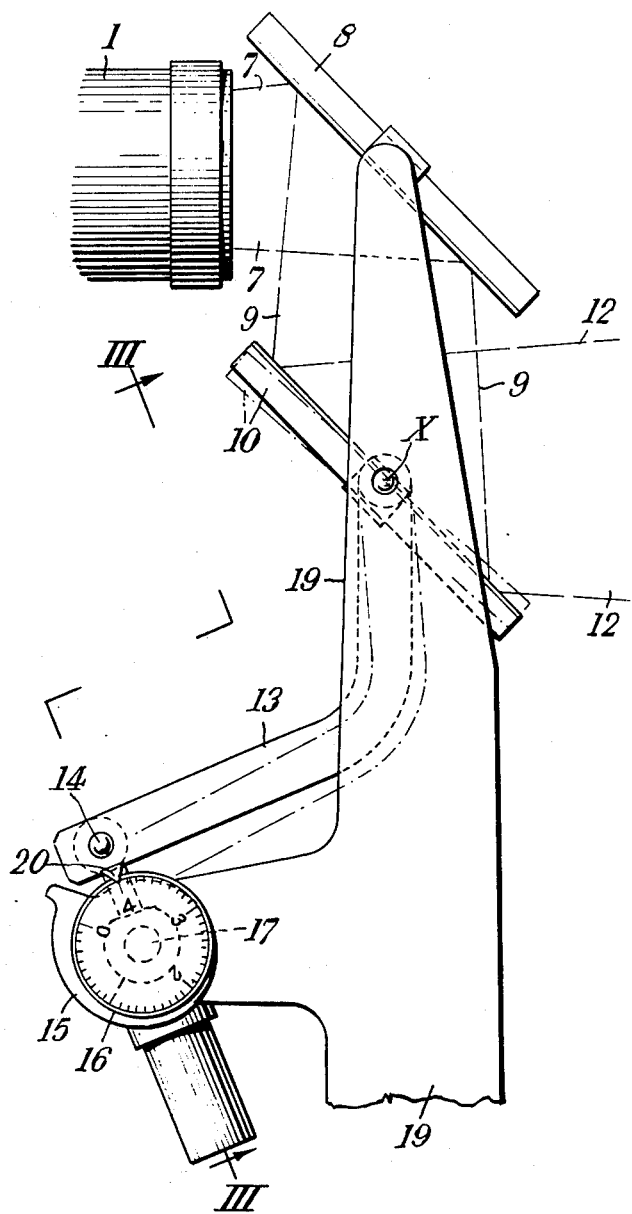
FIG. 2 is a fragmentary side elevation of the light beam deflection means.

As shown in FIG. 2, the beam 7 of light, after passing through the film in the film gate (not shown) of the projector, strikes a fixed mirror 8 which is disposed in a plane at 45° to the horizontal and which deflects the beam 7 from a horizontal to a vertical direction, so that the beam 9 leaving the fixed mirror 8 is directed downwardly towards a movable mirror 10 which is mounted so as to be capable of a small degree of pivotal displacement from a datum position (shown in full lines in FIG. 2) in which it is disposed at an angle of 45° to the horizontal. Thus, in the datum position of the movable mirror 10 the light leaves the latter in a horizontally directed beam 12.

The movable mirror 10 is rigidly attached to the upper end of an L-shaped drop arm 13, the arm 13 and attached mirror 10 being pivotable about a horizontal axis X—X which lies in the plane of the reflective surface of the movable mirror 10. The other and lower end of the arm 13 carries a laterally projecting pin serving as a cam follower 14 engageable with a cam 15 rotatable about a horizontal axis Y—Y under the control of a manually operable knob 16. The knob 16 and cam 15 are interconnected by a short spindle 17 rotatably mounted in a boss 18 of a fixed support member 19 of the projector.

The knob 16 carries markings between 0° and 4° (in increments of 0.1°) in such manner that when the knob is turned to a particular angular setting, for example 2°, the resultant position of the mirror 10 corresponds to an angular elevation of the beam of a similar amount, i.e. 2°, above the horizontal datum. The cam is at its high point (i.e. 0°) at the datum position, clockwise rotation of the knob 16 to the desired angular setting causing progressive reduction in effective cam height. In FIG. 2 the knob 16 is set at 4°. A fixed pointer 20 is used as a reference against which the markings on the knob 16 are set.

Figure 3:
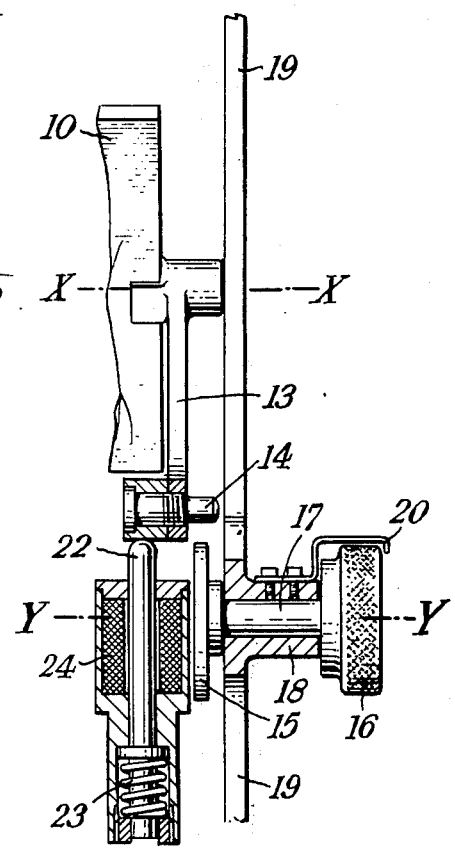
FIG. 3 is a sectional view on the line III—III of FIG. 2.

The variation in position of the arm 13 as determined by the setting of the knob 16 is overriden by a stop. The stop is in the form of a solenoid plunger 22 which is urged upwardly by a helical compression spring 23 to an operative extended position (shown in FIGS. 2 and 3) in which the plunger 22 engages the underside of the arm 13 to retain the latter in the datum position, irrespective of the position of the cam 15. Energisation of the solenoid winding 24 causes the plunger 22 to move downwardly, against the influence of the biasing spring 23, to an inoperative retracted position in which the plunger 22 is clear of the arm 13 so that the latter falls under the influence of gravity until the cam follower 14 engages the cam 15, i.e. to a position determined by the setting of the knob 16.

When the target training equipment is in use the knob 16 is first turned to an angular setting corresponding to the inclination of the beam required on stopping the projector. Whilst the projector is projecting a moving image the plunger 22 retains the arm 13 in the datum position which in turn ensures both that the movable mirror 10 occupies the datum position and that the beam 12 leaving the projector is horizontal. When the projector is stopped, the solenoid winding 24 is automatically energised causing retraction of the plunger 22 and downward pivotal movement of the arm 13, under the effect of gravity, until the cam follower 14 engages the cam 15. The consequent angular movement of the movble mirror 10 deflects the beam to the desired inclination. The arm 13 and mirror 10 now occupy the position shown in broken lines in FIG. 2. De-energisation of the solenoid winding 24 causes the arm 13 and movable mirror 10 to revert to the datum position ready for a repeated sequence.

It will be realised that the angular markings on the knob 16 are calibrated to provide corresponding increments in beam inclination.

In FIG. 1, the screen 2 is shown comprising a plurality of relatively movable sheets, as disclosed in our co-pending application Ser. No. 639,918, filed on Dec. 11, 1975, now abandoned. The sheets are moved by electric motors the movement of which is synchronised with the remainer of the equipment by means of an electrical lead 25 linking the console 5 and the electric motors.

I claim:

1. Light beam deflection means for altering the angle of inclination of a beam of light to a selected value, comprising a pivotally mounted mirror positioned to reflect the beam of light, a cam movable to selected positions dependent upon selected inclinations, a cam follower engageable with the cam, linkage means interconnecting the cam follower and the mirror and an electrically actuated stop operble to engage a lower end of the linkage means in a first extended position and comprising a solenoid in which the stop forms the plunger thereof and which is movable between the first operative extended position in which the stop engages the linkage means lower end to retain the mirror in a datum position irrespective of the position of the cam corresponding to a datum inclination of the beam and a second retracted position in which the linkage means lower end falls by gravity and is engaged by the cam which is selectively positioned depending on the selected inclination whereby the mirror occupies a pivotal position which reflects the beam of light at the selected inclination.

2. In a gunnery training aid comprising a projector and means for moving a film through the projector, a screen onto which a beam of light emanating from the projector may be projected to form a moving image serving as a target at an apparent range, and synchronizing means for stopping movement of the film through the projector when a bullet is fired from a gun at the moving image, the improvement comprising light beam deflection means in the projector for altering the angle of inclination of the beam to a selected value which compensates for the drop in trajectory of the bullet which would have occurred at the apparent range, the light beam deflection means comprising a pivotally mounted mirror positioned to reflect the beam of light, a cam movable to a position dependent upon the selected inclination, a cam follower engageable with the cam, linkage means interconnecting the cam follower and the mirror, and a stop movable under the control of the synchronizing means between an operative extended position in which the stop acts to retain the mirror in a datum position irrespective of the position of the cam corresponding to a datum inclination of the beam, and a retracted position in which the cam follower engages the cam in such a manner that the mirror occupies a pivotal position which reflects the beam of light at the selected inclination, the stop occupying the operative position during the projection of the moving image onto the screen and being moved to the retracted position on stopping movement of the film through the projector.

3. The improvement in the gunnery training aid according to claim 2, wherein the linkage means comprise an L-shaped arm movable downwardly under gravity, an upper end of which is attached to the movable mirror and the lower end of which carries the cam follower and is suppoted by the stop in the operative position.

4. The improvement in the gunnery training aid according to claim 2, wherein the cam is attached to a manually rotatable knob bearing markings corresponding to the angle of inclination of the beam.

5. The improvement in the gunnery training aid according to claim 2, wherein the stop is biased to the operative extended position and is associated with electromagnetic means which act to move the stop to the retracted position, the electromagnetic means being energized under the control of the synchronizing means.

6. The improvement in the gunnery training aid according to claim 5, wherein the electromagnetic means comprise a solenoid, the stop forming the plunger of the solenoid.

7. Range compensation apparatus for a weapons training aid comprising light projector means for projecting a beam of light simulating a target and target screen means positioned a fixed distance from the light projector means for displaying the simulated target, comprising means for altering the vertical position of the projected beam of light on the target screen means after the weapons have been fired by altering the angle of inclination of the beam of light to preselected values to compensate for trajectory change at varying apparent ranges, said means comprising a pivotally mounted mirror positioned to reflect the beam of light, a cam movable to selected positions dependent upon selected inclinations, a cam follower engageable with the cam, linkage means interconnecting the cam follower and the mirror, a stop operative to engage a lower end of the linkage means in a first position in which the stop acts to retain the mirror in a datum position irrespective of the position of the cam corresponding to a datum inclination of the beam and movable to a second range compensating position in which the cam follower engages the cam in such manner that the mirror occupies a pivotal position which reflects the beam of light at a selected inclination to thereby adjust the vertical position of the projected beam of light on the target screen means.

* * * * *

UNITED STATES PATENT AND TRADEMARK OFFICE
CERTIFICATE OF CORRECTION

PATENT NO. : 4,048,730
DATED : September 27, 1977
INVENTOR(S) : Michael John Edwards It is certified that error appears in the above-identified patent and that said Letters Patent are hereby corrected as shown below:

Column 1, line 8, change "ina" to --in a--.

Column 1, line 22, change "light at a" to --light at the--.

Column 2, line 65, change "movble" to --movable--.

Column 3, line 11, change "remainer" to --remainder--.

Column 3, line 22, change "operble" to --operable--.

Column 4, line 14, change "suppoted" to --supported--.

Signed and Sealed this

Twenty-fourth Day of January 1978

[SEAL]

Attest:

RUTH C. MASON
Attesting Officer

LUTRELLE F. PARKER
Acting Commissioner of Patents and Trademark